US012430882B1

(12) United States Patent
K C et al.

(10) Patent No.: US 12,430,882 B1
(45) Date of Patent: Sep. 30, 2025

(54) OBJECT CLASSIFICATION FOR VISUAL SEARCH

(71) Applicant: A9.com, Inc., Palo Alto, CA (US)

(72) Inventors: Amit Kumar K C, Sunnyvale, CA (US); Arnab Dhua, Cupertino, CA (US); Doug Gray, Redwood City, CA (US)

(73) Assignee: Amazon Technologies, Inc., Reno, NV (US)

( * ) Notice: Subject to any disclaimer, the term of this patent is extended or adjusted under 35 U.S.C. 154(b) by 613 days.

(21) Appl. No.: 17/708,378

(22) Filed: Mar. 30, 2022

(51) Int. Cl.
*G06V 10/764* (2022.01)
*G06Q 30/0601* (2023.01)
*G06T 7/60* (2017.01)
*G06T 7/70* (2017.01)
*G06V 10/40* (2022.01)

(52) U.S. Cl.
CPC ....... *G06V 10/764* (2022.01); *G06Q 30/0623* (2013.01); *G06T 7/60* (2013.01); *G06T 7/70* (2017.01); *G06V 10/40* (2022.01); *G06T 2207/30196* (2013.01)

(58) Field of Classification Search
CPC ........ G06V 10/764; G06V 10/40; G06T 7/70; G06T 7/60; G06Q 30/0623
See application file for complete search history.

(56) References Cited

U.S. PATENT DOCUMENTS 10,909,349 B1 * 2/2021 Tripathi .................. G06T 19/00
2019/0050691 A1 * 2/2019 Lee .................... G06F 18/24323

* cited by examiner

*Primary Examiner* — Matthew C Bella
*Assistant Examiner* — Jinsu Hwang
(74) *Attorney, Agent, or Firm* — Hogan Lovells US LLP

(57) ABSTRACT

The present disclosure presents approaches for accurately detecting one or more objects of interest in an input image. A bounding box may be generated around the object of interest and may be processed to predict a classification of the object of interest. One or more spatial features may also be determined based, at least in part, upon additional image data located within a second bounding box, relative to the original bounding box. Using the spatial features, a second prediction vector may be generated and combined with the first prediction vector to generate a third prediction vector which may help to accurately classify the object of interest. Using the third prediction vector, recommended content may be determined and provided for display, among other such options.

16 Claims, 11 Drawing Sheets

OBJECT CLASSIFICATION FOR VISUAL SEARCH

BACKGROUND

Many online marketplaces rely on the use of visual classifiers to recognize objects of interest in an image based on visual information. Such classifiers may analyze an image area around a bounding box of interest and predict one or more potential object types, such as apparel or furniture for example. Because these types of classifiers typically predict an object type based only on the image area directly surrounding the bounding box, in some cases, the classifier may confuse the item with another apparel type. Such cases may include situations where an item may share features similar to other items. For example, the classifier may identify a bag as being a tote bag instead of a cross-body bag because the tote and cross-body bag may both have long straps. Additionally, in cases where an item may be partially obstructed, a classifier might not be able to accurately determine what the item is based on the limited image data. Thus, relying solely on such a conventional process may therefore produce inaccurate results for the user, and may potentially discourage a user from continuing to use the platform.

An image detection system may also attempt to analyze an input image as a whole to extract as many features as possible, in order to maximize the accuracy of the classification. However, such a method may put an unnecessary strain on the computing system and create delays in processing due to how cumbersome the process would be for the computing system.

BRIEF DESCRIPTION OF THE DRAWINGS

Various embodiments in accordance with the present disclosure will be described with reference to the drawings, in which.

DETAILED DESCRIPTION

Figure 1B:
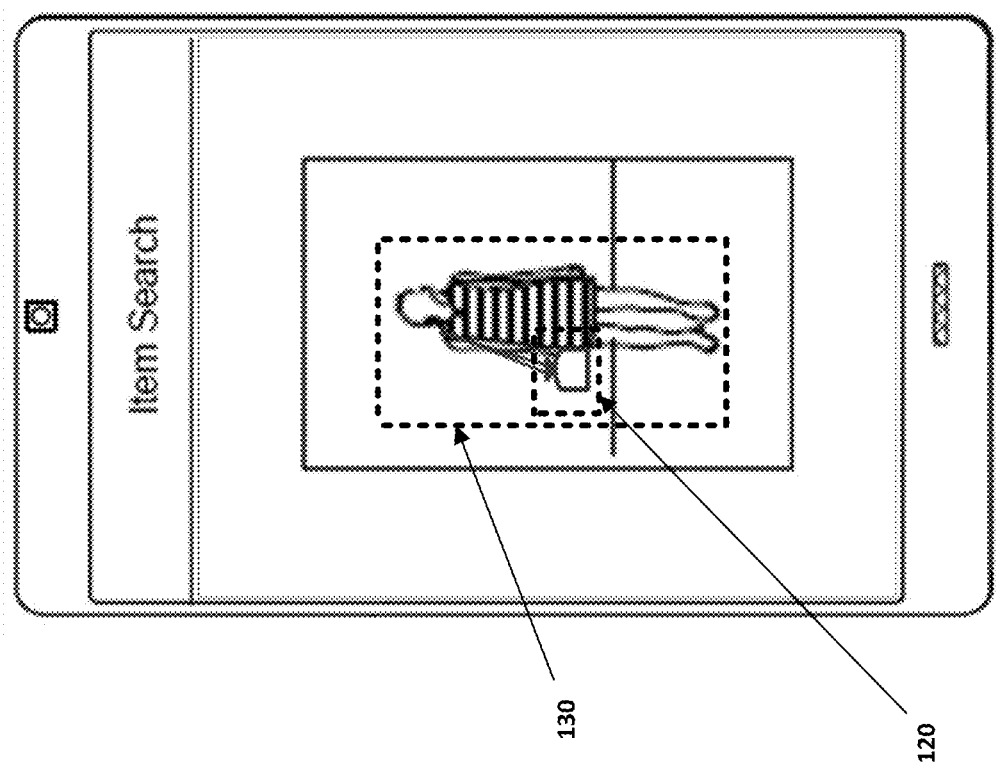
FIGS. 1A and 1B illustrate an example process for determining information associated with an item of interest, that can be utilized in accordance with various embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Systems and methods in accordance with various embodiments of the present disclosure may overcome one or more of the aforementioned and other deficiencies experienced in conventional approaches to object detection and classification in an electronic environment. In particular, various embodiments of the present disclosure utilize a machine learning-based approach or other such approach for accurately categorizing objects of interest in an image and presenting recommended content for display on a client device.

In various embodiments, a user may provide (e.g., upload) a digital image (e.g, image data) of an item, a room, or a person wearing an item, as part of a request. The image data, when received, may be processed by a server to generate a bounding box around at least one object of interest detected in the image. Based on the detected object of interest, a first prediction vector may be generated, accounting for a classification of the object of interest. Additionally, one or more spatial features may be determined by the server based on image data located within another bounding box. In some embodiments, the spatial features may be determined relative to the bounding box around the object of interest. For example, a second bounding box may be generated around another object in the image, such as a person or an item present or detected in the image, such as a bed present in an image of a bedroom. Information associated with the first bounding box and information associated with the second bounding box may be compared and analyzed to determine the spatial features. A machine learning model may be utilized to generate a second prediction vector based on the spatial features. The second prediction vector may also indicate potential classifications of the object of interest. The first prediction vector and the second prediction vector may be combined to generate a third prediction vector, which may be more accurate at classifying the object of interest than the first prediction vector or the second prediction vector alone. Content may be determined based, at least in part, upon the third prediction vector and presented to the user for various purposes.

Accordingly, in accordance with various embodiments, the present disclosure presents an improvement in e-commerce technology by providing approaches for accurately classifying objects located in an input image and providing improved results to a user in a computationally-efficient way. Various other functions and advantages are described and suggested below as may be provided in accordance with the various embodiments.

Figure 1A:
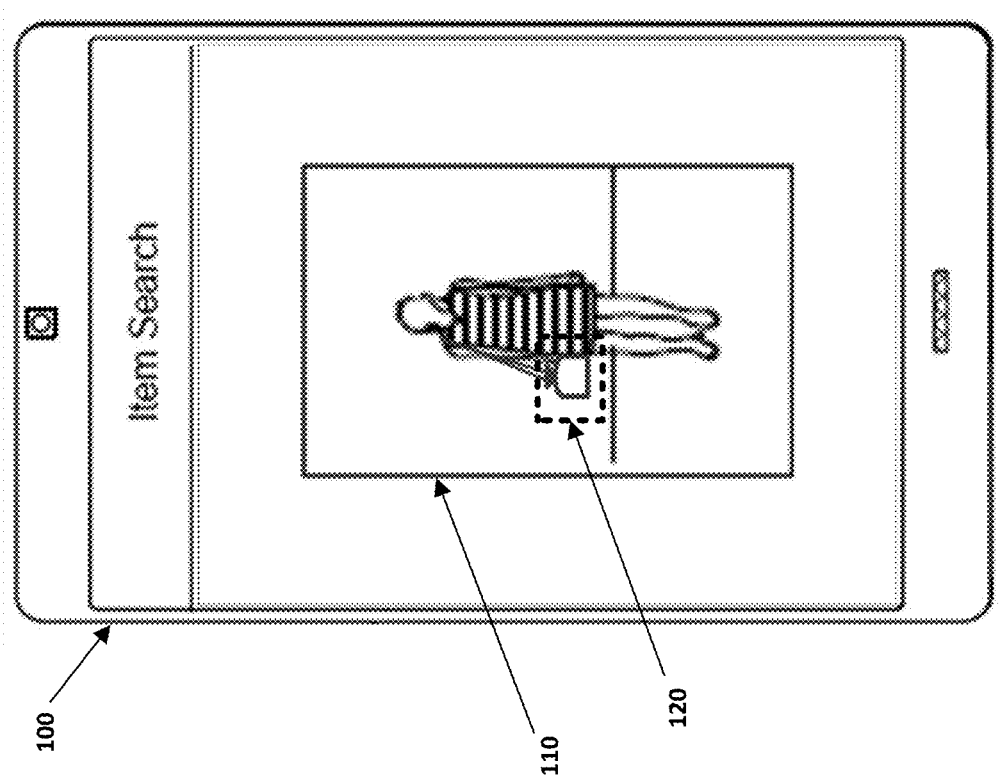

FIGS. 1A and 1B illustrate an example process for determining information associated with an item of interest, that can be utilized in accordance with various embodiments. According to this example, a user operating an electronic device 100 may provide an image for processing, where the image may include one or more items. For example, a user may provide an image 110 as part of a request for similar items available for purchase on an e-commerce marketplace. Alternatively, the user may provide the image as part of a request for the computing system to generate caption and other information describing items within the image. According to another example, the user may provide the image as part of an update to an electronic wardrobe.

As shown in FIG. 1A, a computing system may analyze the image 110 and generate a bounding box 120 around one or more objects or items of interest in the image. According to another example, a user may draw their own bounding boxes around various objects in the image, such as through a display screen using a finger or stylus. The user may also select one or more elements corresponding to the bounding boxes to highlight or ignore specific objects in the image. In this example, a bounding box may be generated around a handbag present in the image.

A classifier may be utilized to analyze the image area around the bounding box and predict or determine potential apparel types. For example, a classifier may attempt to analyze the image area around the handbag and generate a prediction vector for identifying what type of handbag it is. The prediction vector may be made up of a set of numbers, where each number corresponds to a confidence score or value. Because the classifier predicts the apparel type based only on the image area directly surrounding the bounding box, in some cases, the classifier may confuse the item with another apparel type. For example, the classifier may inaccurately identify the bag as being a tote bag instead of a cross-body bag, thereby affecting the end results provided to the user.

Additionally, a feature detector may inadvertently omit detection of other features of the bag, such as the straps for example. In such cases, the feature detector may analyze features surrounding the bag, including the strap, and then attempt to classify what the bag is. However, such detection processes may not always be accurate, especially in cases where different items share similar features. For example, both a tote bag and a cross-body bag may have a long strap, so an image detection system according to this example may misclassify a cross-body bag as being a tote bag. An image detection system may attempt to analyze an input image as a whole to extract as many features as possible to maximize the accuracy of the classification. However, this method may put an unnecessary strain on the computing system and create delays in processing due to how cumbersome the process would be on the computing system.

To address these problems, one or more image features, such as spatial priors or spatial features, may be extracted from the image and compared to the object of interest. "Spatial priors" or "spatial features" may include, but are not limited to, data associated with entropy of a prediction vector (e.g., a confidence of a visual classifier alone), an area of an object of interest normalized by image data, a size of the bounding box around the object of interest, a distance between the object of interest's centroid and the person's centroid, a distance between the object of interest's centroid and the image's centroid, a distance between the object of interest's centroid and another object's centroid, a detection score, a width of the object of interest, a height of an object of interest, a width of the bounding box around the object of interest, a height of the bounding box around the object of interest, an aspect ratio of the object of interest, and a delta between the object of interest and the person/other object with respect to x- and y-coordinates. An "object" may include an item, a feature, a person, or a representation of a person provided within the image.

In some embodiments, to determine or extract the spatial features, a bounding box 130 may be generated or drawn around a person (e.g., object) located in the image, as shown in FIG. 1B, and information, or spatial priors, may be determined or extracted based on this bounding box relative to the bounding box around the item 120. According to an example, the width and height of the bounding box around the item and/or the person may be determined, and may help the system identify and extract the spatial features. In some examples, machine learning may be utilized to extract the spatial features.

In the example shown in FIG. 1B, the spatial priors or spatial features may include, but are not limited to, an area of the bag normalized by image data, a size of the bounding box around the bag, a distance between the bag's centroid and the person's centroid, a distance between the bag's centroid and the image's centroid, a distance between the bag's centroid and another object's centroid, a detection score, a width of the bag, a height of the bag, a width of the bounding box around the bag, a height of the bounding box around the bag, an aspect ratio of the bag, and a delta between the bag and the person/other object with respect to x- and y-coordinates. Pose information related to where the bag hangs on the person may also be analyzed. For example, the image detection system may determine a location of the bag relative to the person detected in the image, such as whether the bag is closer to the bottom-half of the person, if the bag is held in the person's hand, if the bag is located on the person's back, or if the bag is located near the person's waist, among other such options. Pose information about the person represented in the image may be extracted as part of or separately from the spatial features. In a case where a person is cropped in an image and the system cannot easily compare the bounding box of the object to the bounding box around the person, one or more of the extracted spatial features may be able to compensate for other spatial features which may be affected. For example, the distances to the left or right side of the image might still be scaled, even if the legs of the person were cropped out of the image. Additionally, the system may be able to identify joints such as knees or elbows and make predictions based on these detected features relative to the object of interest.

This spatial information may be used as an additional signal to reinforce the results of an initial classification of the object of interest. Once one or more spatial priors have been extracted, a machine learning model may use the spatial priors to generate a prediction vector accounting for the spatial prior information. As previously explained, the prediction vector may be comprised of a set of numbers corresponding to confidence scores or values related to a classification of an object of interest in an input image. Training data for the machine learning model may include one or more items categorized in a database, pose information stored in a database, or results from a run of one or more processes described herein. Training data may additionally be acquired or generated by taking a previously-classified image, flipping the image data left to right or right to left, and processing that data using one or more methods described herein. In this way, the flipped image may serve as additional training data, making the model more robust, thereby improving the system's ability to provide more accurate results to the user.

The prediction vector generated by the classifier and the prediction vector accounting for the spatial prior information may be combined, as a convex combination, or otherwise blended into a new prediction vector. In one example, the two prediction vectors may be combined or blended as a part of a convex combination, but the vectors may alternatively be combined via another machine learning model or any other combination. For example, in an example where a machine learning model is used to combine the two prediction vectors, the two prediction vectors may be concatenated with fully-connected layers providing an indication of a combined prediction. The new prediction vector may be more accurate in identifying what type of object the object of interest is. According to this example, the new prediction vector may identify the bag as being a cross-body bag, enabling the system to present more accurate results to the user.

Prior to generation of the combined vectors, one or more parameters may be fine-tuned. For example, in a convex process, an alpha value corresponding to a parameter may be fine-tuned. The alpha value may be fixed for individual categories of items or objects. For example, bags might have their own alpha value, shirts might have their own alpha value, and shoes may have their own alpha value. Alternatively, types of items within a single category may have their own alpha values. For example, bags may have individual alpha values for cross-body bags, totes, etc. This process is explained in more detail with respect to FIG. 8.

One or more aspects of the present disclosure may be implemented using one or more machine learning models, including, but not limited to, deep learning models such as convolutional neural network (CNN)-based classifiers, multi-layer perceptron, long short term memory networks (LSTMs), recurrent neural networks (RNNs), and general adversarial networks (GANs), in addition to random forest or other classical machine learning models. Additionally, the system may be end-to-end trainable such that the output of the combined vectors may be utilized to train another network. For example, the combined vector may be used as ground truth data for a machine learning model, and could be used to make future classifications more accurate over time. According to the example shown in FIGS. 1A and 1, if the first prediction vector indicates that the bag is a tote and the second prediction vector indicates that the bag is a cross-body bag, then the ground truth data, derived from the combined prediction vectors, may correspond to a cross-body bag.

Figure 2A:
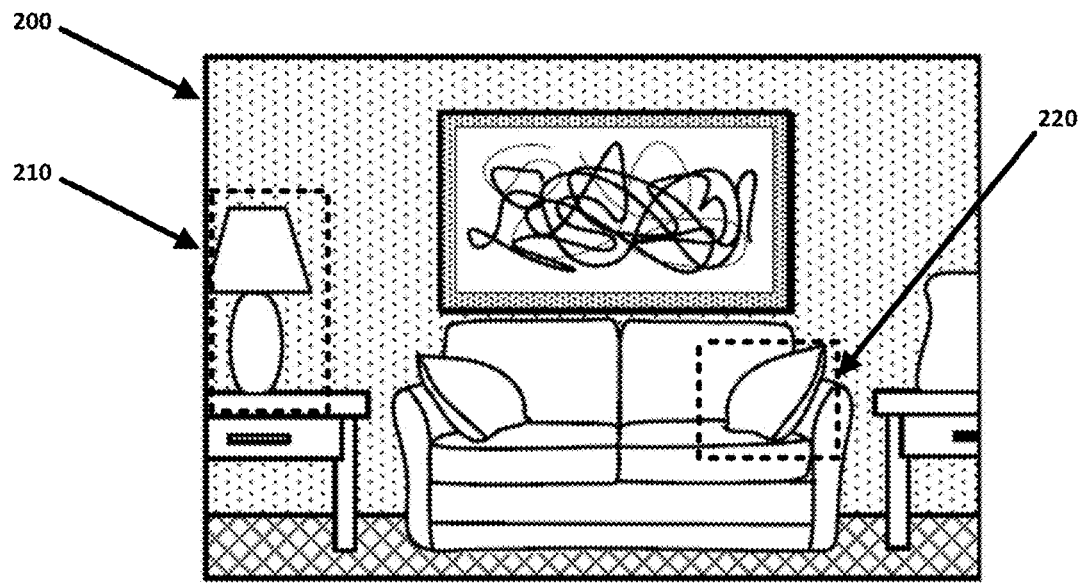
FIGS. 2A and 2B illustrate an example process for determining information associated with another item of interest, that can be utilized in accordance with various embodiments.
Figure 2B:
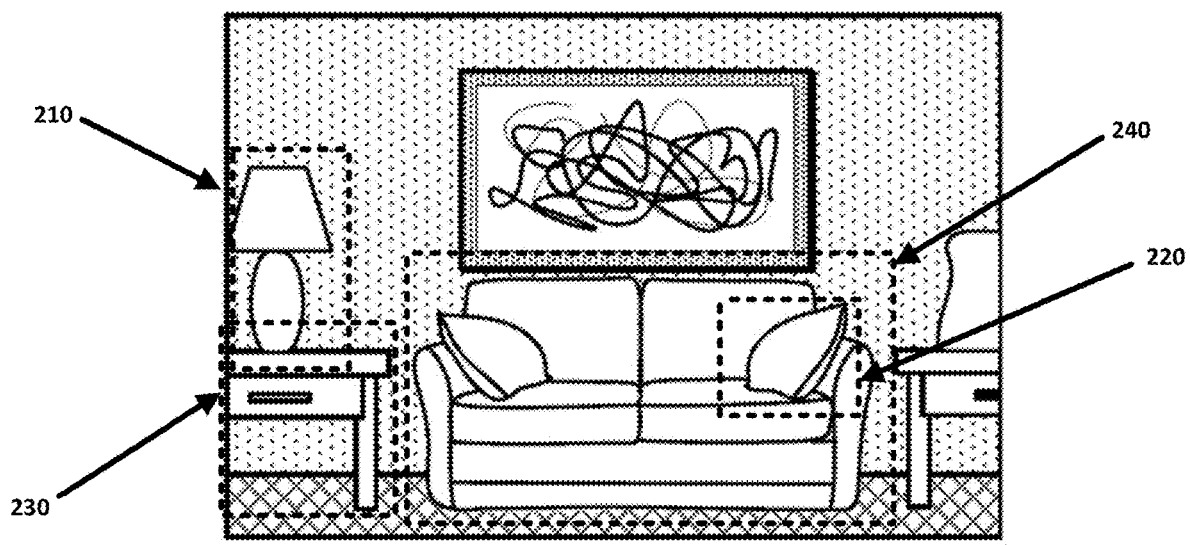

FIGS. 2A and 2B illustrate an example process for determining information associated with another item of interest, that can be utilized in accordance with various embodiments. As shown in FIG. 2A, one or more bounding boxes 210, 220 may be generated or drawn around one or more objects of interest in an image 200. According to this example, bounding boxes are generated or drawn around a lamp and a pillow. As described above with respect to FIGS. 1A and 1B, a classifier may be utilized to analyze the image area around the bounding boxes and predict or determine potential types of furniture or decor. For example, a classifier may attempt to analyze the image area around the lamp and generate a prediction vector for use in identifying what type of lamp it is (e.g., floor lamp, desk lamp, night-stand lamp, among other such options). The classifier may also try to analyze an image area around the pillow to determine what type of pillow it is (e.g., pillow for a bed, pillow for a couch, pillow for a baby, among other such options). However, because the classifier predicts the type of item based only on the image area directly surrounding the bounding box, the classifier may confuse the item with another item type. For example, the classifier may identify the lamp as being a night stand lamp for a bedroom instead of a coffee table lamp for a living room, or the classifier may identify the pillow as being a bedroom pillow instead of a pillow for a living room couch, which may therefore produce inaccurate or irrelevant results for the user.

To account for this inaccuracy, one or more spatial priors may be extracted from the image. For example, as shown in FIG. 2B, a bounding box 230, 240 may be generated or drawn around an object located in the image, and feature information, such as spatial priors or spatial features, may be extracted based on this bounding box relative to the bounding box around the item 210, 220. In this example, spatial priors may include information related to the coffee table or the couch, which are items known by the system to exist in a living room. Once the one or more spatial priors have been extracted, a machine learning model may use the spatial priors to generate a prediction vector accounting for the spatial prior information. Then, the prediction vector generated by the classifier and the prediction vector accounting for the spatial prior information may be combined, as a convex combination, or otherwise blended into a new prediction vector. The new prediction vector may accurately identify what type of object the object of interest is. According to this example, the new prediction vector may identify the lamp as being a living room lamp, or the pillow as belonging to a living room couch, enabling the system to present more accurate and relevant results to the user.

Figure 3:
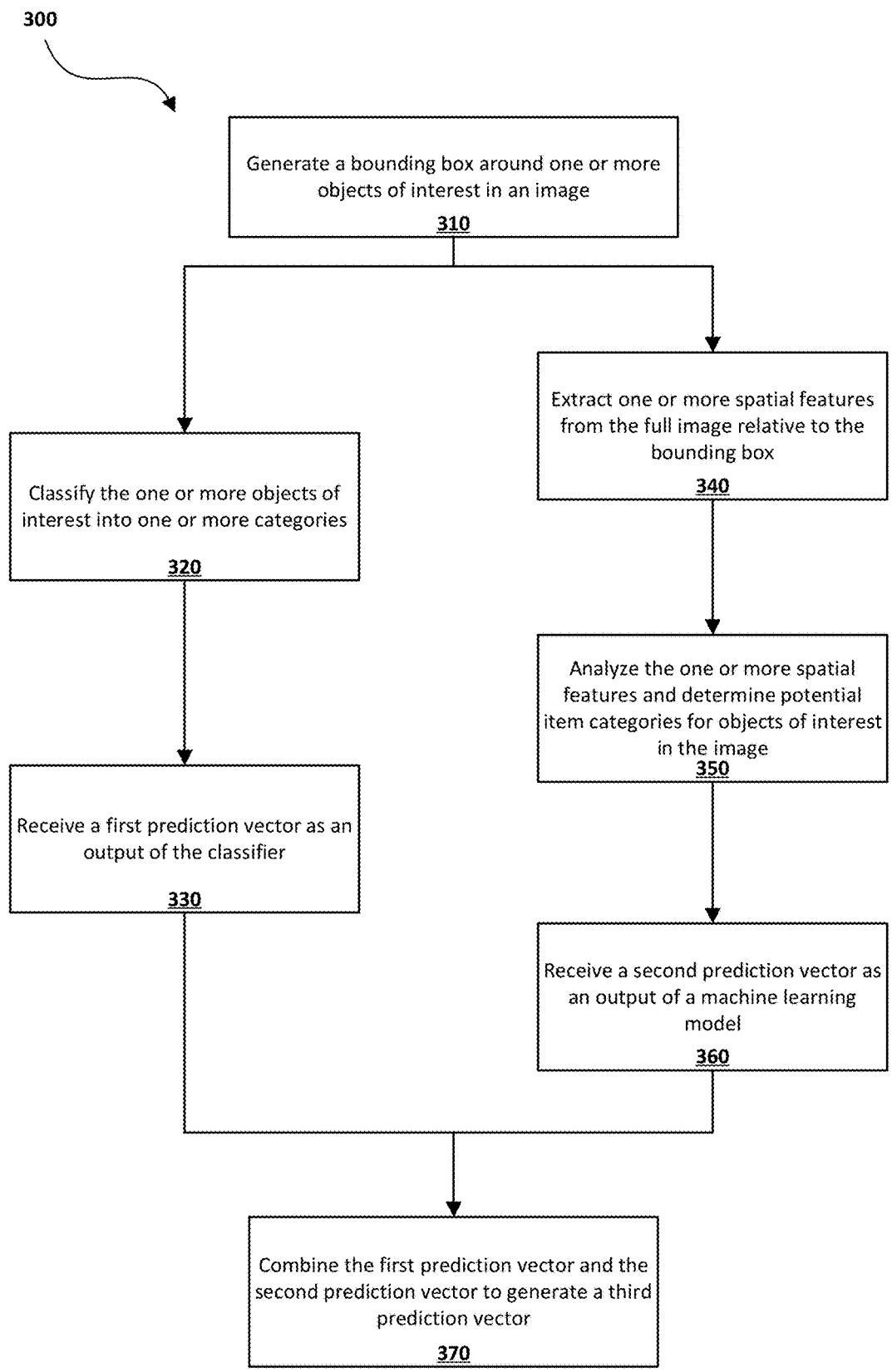
FIG. 3 illustrates an example method that can be used to implement aspects of the various embodiments.

FIG. 3 illustrates an example method that can be used to implement aspects of the various embodiments. According to this example, a bounding box may be generated around one or more objects or items of interest in an image 310. The bounding box may be automatically generated around one or more objects. According to another example, the bounding box may be drawn, selected, or otherwise defined by a user. The one or more objects of interest within the image may be classified, via a classifier, into one or more categories 320. For example, objects of interest may be classified into categories such as bags, types of apparel, types of furniture, among other such options. A first prediction vector may then be generated based on the output of the classifier 330. In some embodiments, the first prediction vector may be comprised of a set of numbers corresponding to a set of confidence scores or values, where the confidence scores or values are indicative of a confidence that the classification is accurate.

Additionally, one or more spatial features may be extracted from the image, relative to the bounding box 340. For example, spatial features may be extracted based on information related to the bounding box and features external to the bounding box within the image, or based on information related to the bounding box and a second bounding box generated around another object within the image. The spatial features may be analyzed to determine potential item categories for objects of interest in the image 350. For example, a machine learning algorithm may be utilized to analyze the spatial features and determine the potential item categories. "Spatial features" may include, but are not limited to, data associated with entropy of a prediction vector, an area of an object of interest normalized by image data, a size of the bounding box around the object of interest, a distance between the object of interest's centroid and the person's centroid, a distance between the object of interest's centroid and the image's centroid, a distance between the object of interest's centroid and another object's centroid, a detection score, a width of the object of interest, a height of an object of interest, an aspect ratio of the object of interest, and a delta between the object of interest and the person/other object with respect to x- and y-coordinates. In at least some embodiments, spatial features might not need to be extracted, such as may be the case where the first prediction satisfies at least a minimum threshold level of confidence.

As an output of the machine learning model, a second prediction vector may be received by the system 360. The second prediction vector may provide additional information which may be utilized to more accurately classify the one or more objects of interest. After the first prediction vector and the second prediction vector have been generated, they may be combined or blended as a convex combination to create or generate a third prediction vector 370. The convex combination parameter may be tuned by performing a grid-search process on a training set so that the accuracy of the new prediction vector is maximized. For example, a convex combination parameter may correspond to an individual item category. A parameter value corresponding to a highest accuracy may be selected and applied to the third prediction vector for fine-tuning.

Figure 4:
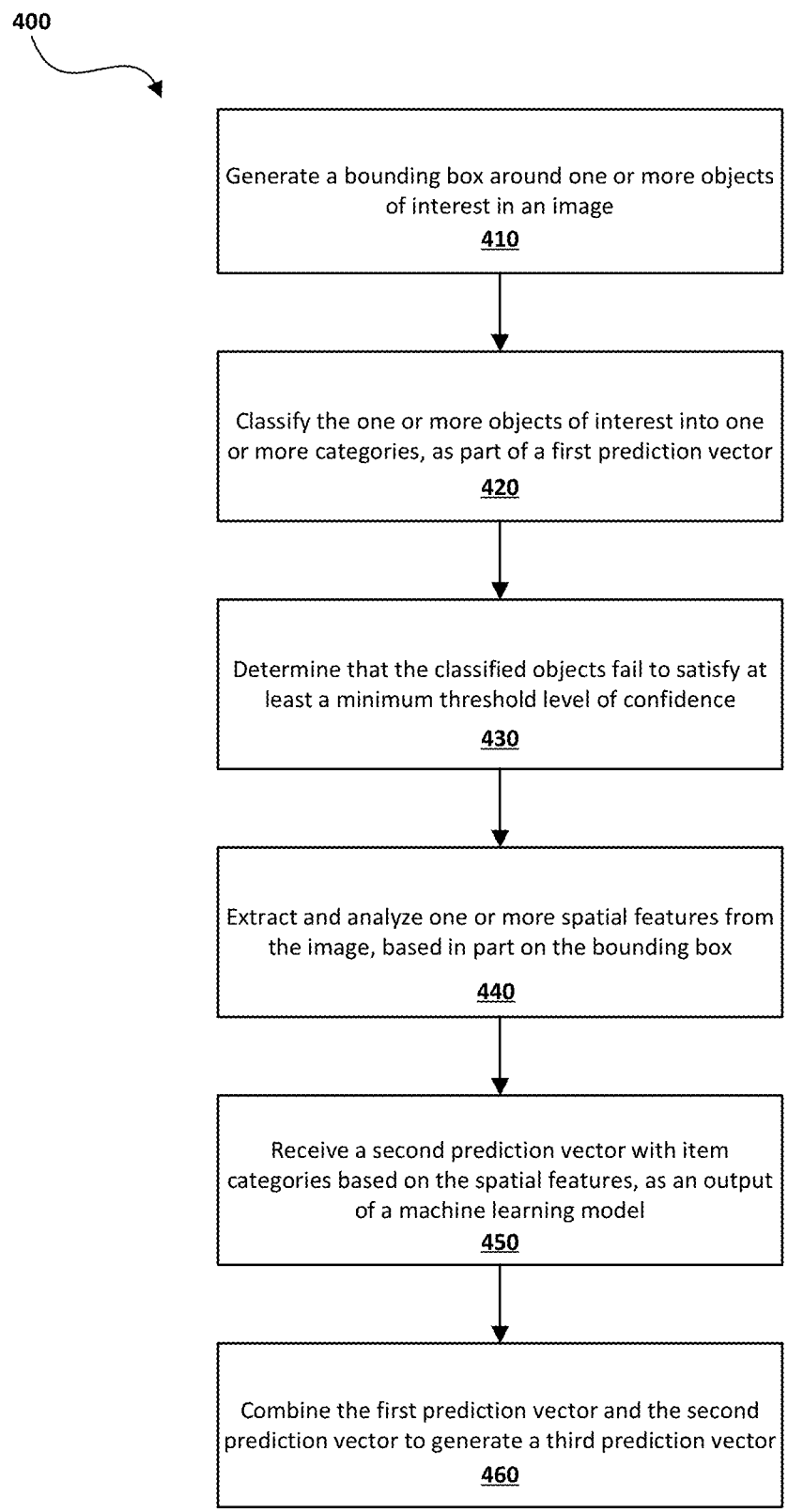
FIG. 4 illustrates another example method that can be used to implement aspects of the various embodiments.

FIG. 4 illustrates another example method 400 that can be used to implement aspects of the various embodiments. In this example, a bounding box may be generated around one or more objects of interest in an image 410. Using a classifier, the one or more objects of interest may be classified into one or more categories, as part of a first prediction vector 420. In some embodiments, the first prediction vector may be analyzed to determine whether the categorization satisfies at least a minimum threshold level of confidence 430. For example, the categorized object of interest may be assigned a confidence score or weight, indicating how confident the system is that the categorization of the object of interest is accurate. The confidence score or weight may then be compared against a determined threshold value. If the confidence score or weight falls below the threshold value, then one or more spatial features may be extracted from the image and analyzed 440. In some embodiments, the one or more spatial features may be extracted regardless of whether the confidence score or weight for the categorization falls below the threshold value. According to an example, a bounding box may be generated around a person located in the image and compared to the bounding box around the one or more objects. Alternatively, a bounding box may be generated around a piece of furniture or other similar object for use in extracting spatial features. "Spatial features" may include, but are not limited to, data associated with entropy of a prediction vector, an area of an object of interest normalized by image data, a size of the bounding box around the object of interest, a distance between the object of interest's centroid and the person's centroid, a distance between the object of interest's centroid and the image's centroid, a distance between the object of interest's centroid and another object's centroid, a detection score, a width of the object of interest, a height of an object of interest, an aspect ratio of the object of interest, and a delta between the object of interest and the person/other object with respect to x- and y-coordinates.

A machine learning model may analyze the spatial features and generate a second prediction vector with item categories 450. The first prediction vector and the second prediction vector may then be combined, using a convex function or other type of function, to generate a third prediction vector 460. The third prediction vector may provide a result having a higher level of accuracy than the first prediction vector, as the third prediction vector accounts for the initial prediction and the prediction generated based on the spatial features. For example, the first prediction vector, the second prediction vector, and the third prediction vector may each have respective levels of accuracy, where the level of accuracy may be indicative of how accurate the prediction is. In some embodiments, the level of accuracy may correspond to a score or percentage indicating how accurate the prediction is. According to an example, a grid search process or other fine-tuning process may be applied to the first vector and the second vector, to determine one or more parameters which would optimize the prediction(s) for accuracy.

Figure 5:
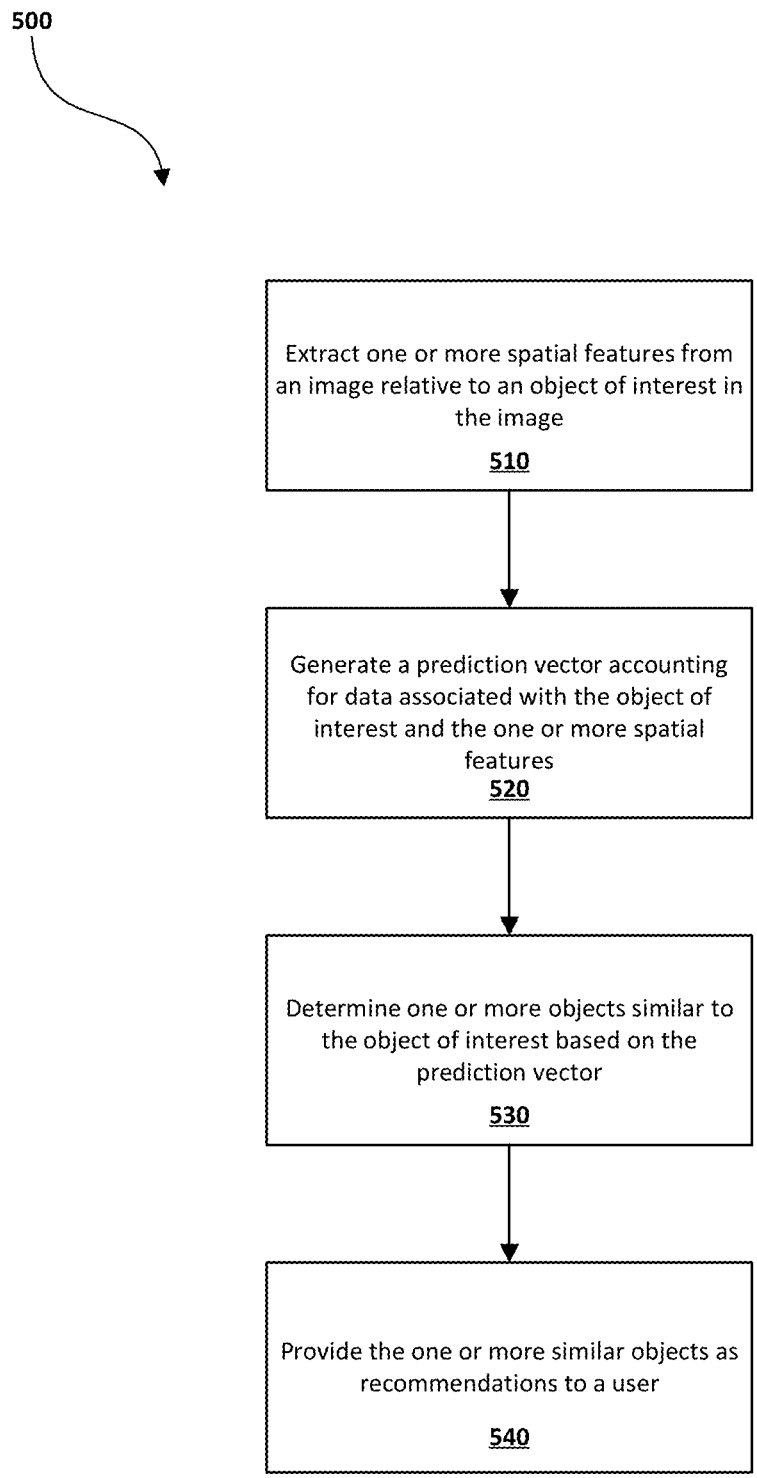
FIG. 5 illustrates another example method that can be used to implement aspects of the various embodiments.

FIG. 5 illustrates another example method 500 that can be used to implement aspects of the various embodiments. In this example, one or more spatial features may be extracted from an image, relative to an object of interest in the image 510. Spatial features may be extracted according to one or more processes described elsewhere herein. A prediction vector accounting for data associated with the object of interest and the one or more spatial features may be generated 520. According to one example, the data associated with the object of interest may include data indicating a classification type of the object of interest in the image. One or more objects similar to the object of interest may then be determined, based at least in part on the prediction vector 530. According to an example, the similar objects may be stored on an online database, and may be accessed and compared to the object of interest to determine whether the objects are similar. After the similar objects have been determined, they may be provided for display to a user 540, such as through a client device.

Figure 6:
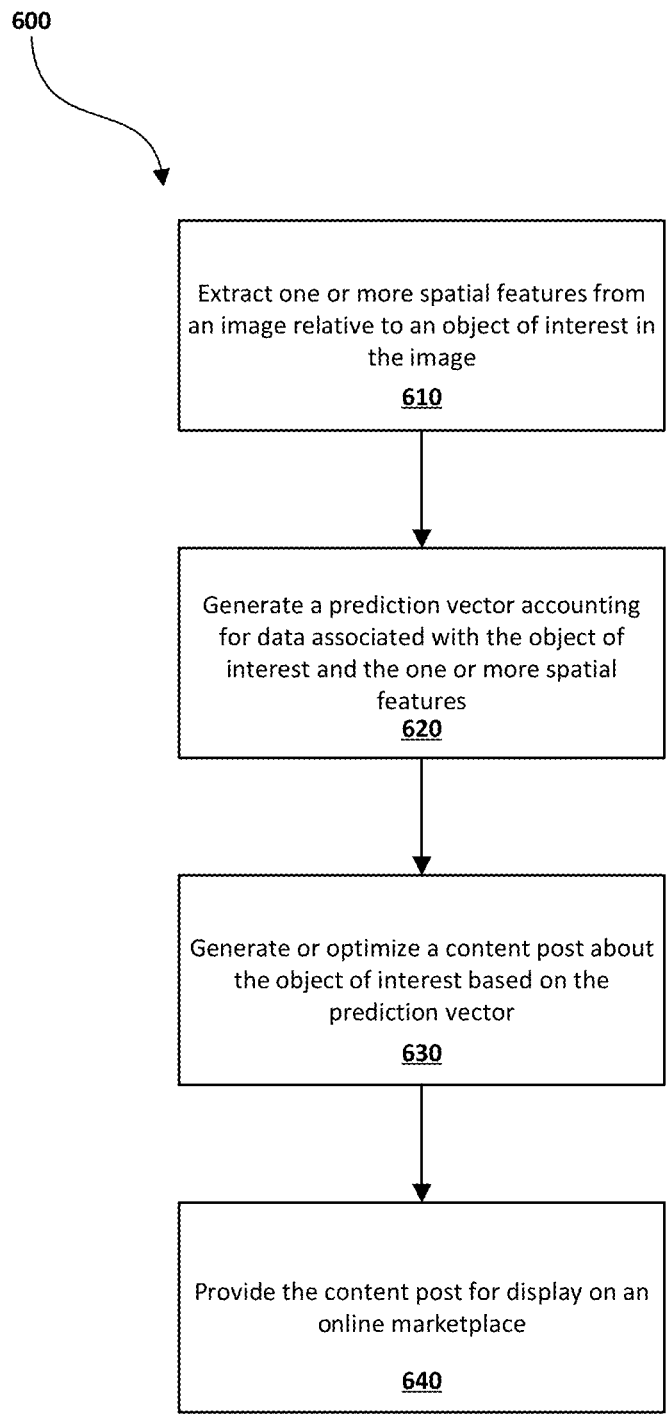
FIG. 6 illustrates another example method that can be used to implement aspects of the various embodiments.

FIG. 6 illustrates another example method 600 that can be used to implement aspects of the various embodiments. In this example, one or more spatial features may be extracted from an image, relative to an object of interest present in the image 610. A prediction vector, accounting for data associated with the object of interest and the one or more spatial features, may be generated 620. A content post about the object of interest may be generated or optimized based on the prediction vector 630. The generated or optimized content post may then be provided for display in an online marketplace 640. By way of example only, a user may generate a content post with an associated image, explaining that they are selling a bag or purse. The system may extract spatial features from the photograph, generate a prediction vector suggesting that the bag or purse is a cross-body bag, and modify the content post to provide additional details. In this way, the content post may be optimized because the additional details may help the content post perform better in an online marketplace.

Figure 7:
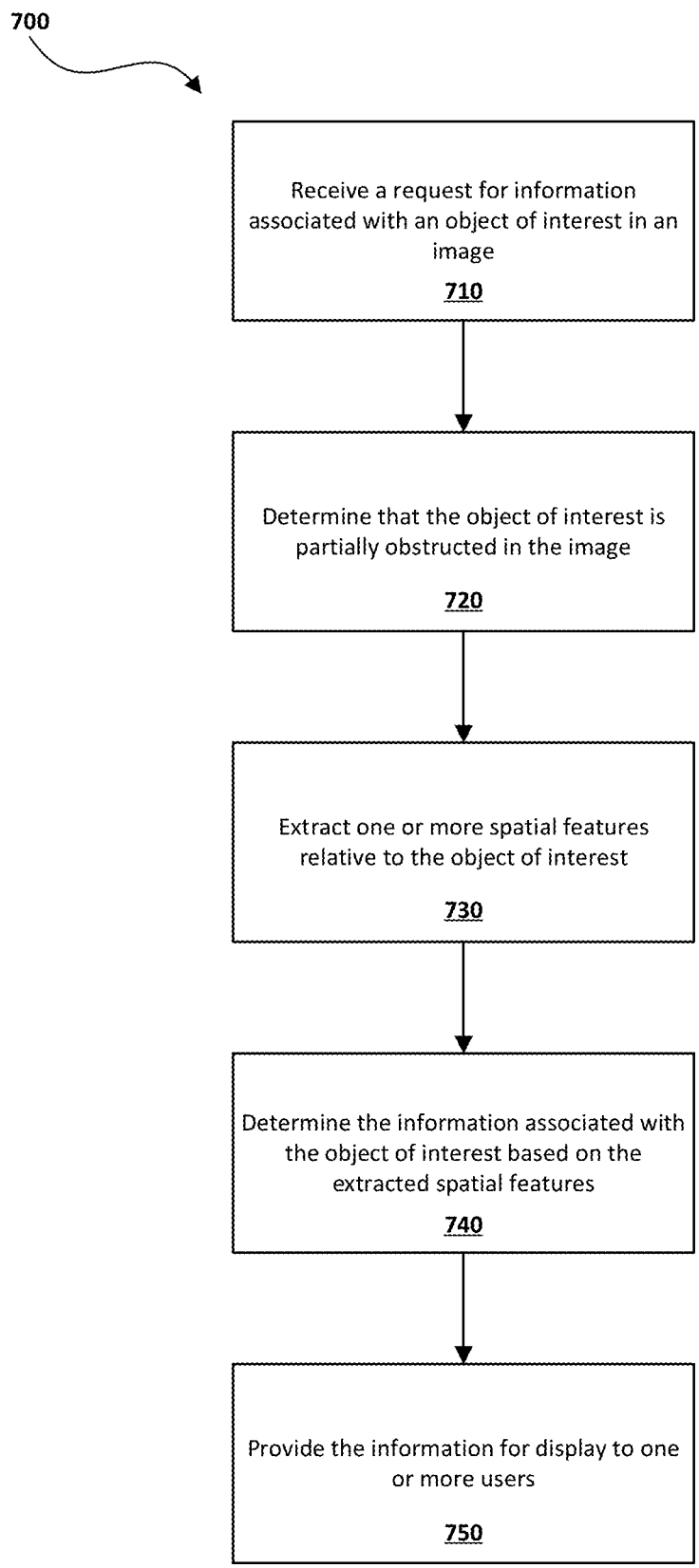
FIG. 7 illustrates another example method that can be used to implement aspects of the various embodiments.

FIG. 7 illustrates another example method 700 that can be used to implement aspects of the various embodiments. In this example, a request for information associated with an object of interest in an image may be received at one or more servers 710. At the server, a determination may be made that the object of interest is partially obstructed in the image 720. Also at the server, one or more spatial features may be extracted, relative to the object of interest 730. The information associated with the object of interest may then be determined, based, at least in part, upon the extracted spatial features 740. The information may be provided for display to one or more users 750. In this example, such information may include recommendations for items similar to the object of interest. Such information may also include information related to object tracking. For example, a user may have a virtual closet, and the system may update items in the virtual closet to track a number of times an item has been worn, or update items based on obscured features which were previously undetectable in other images. Using one or more methods described herein, a full image showing the object of interest is not required, and spatial features may be utilized to increase the system's confidence and accuracy in object detection and classification.

Figure 8:
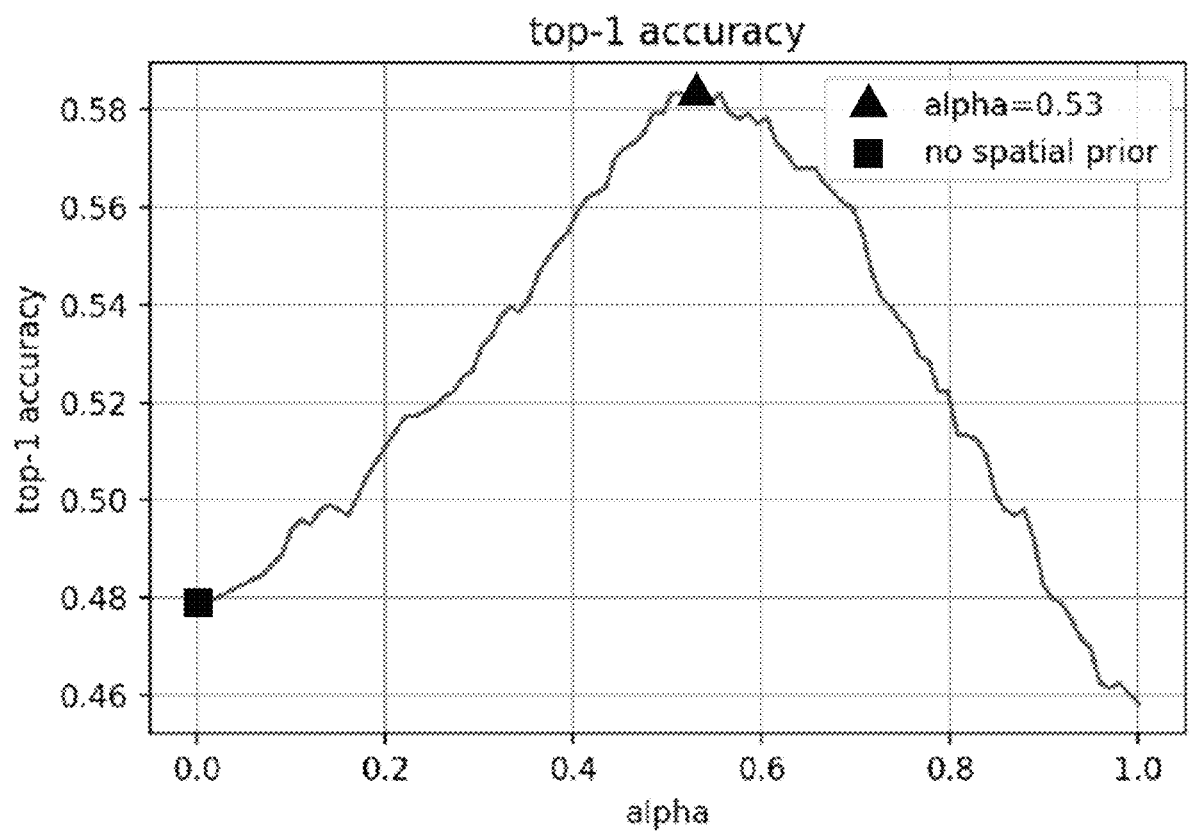
FIG. 8 illustrates an exemplary result of a fine-tuning process that can be used in accordance with various embodiments.

FIG. 8 illustrates an exemplary result of a fine-tuning process that can be used in accordance with various embodiments. This example result is provided for illustrative purposes only, and is not intended to be limiting in any way. As explained above, after the first prediction vector and the second prediction vector have been generated, they may be combined or blended as a convex combination to create or generate a third prediction vector. Prior to generating the third prediction vector, a convex combination parameter may be fine-tuned by performing a grid-search process on a training set so that the accuracy of the new prediction vector can be maximized. For example, a convex combination parameter may correspond to an individual item category. A parameter value, denoted by the triangle in FIG. 8, corresponding to a highest accuracy, may be selected and applied to the third prediction vector for fine-tuning. A parameter value determined without using a spatial prior, such as the data point denoted by the square in FIG. 8, may have a lower accuracy. This example result shows how the use of spatial priors does improve the accuracy of the system for object classification. The alpha values may be fixed for individual categories of items or objects. For example, bags might have their own alpha value, shirts might have their own alpha value, and shoes may have their own alpha value. Additionally, totes may have their own alpha values, cross-body bags may have their own alpha values, and other types of bags may similarly have their own alpha values. Though this example is based on a convex combination of the two vectors, similar fine-tuning processes may be applied in other types of implementations.

Figure 9A:
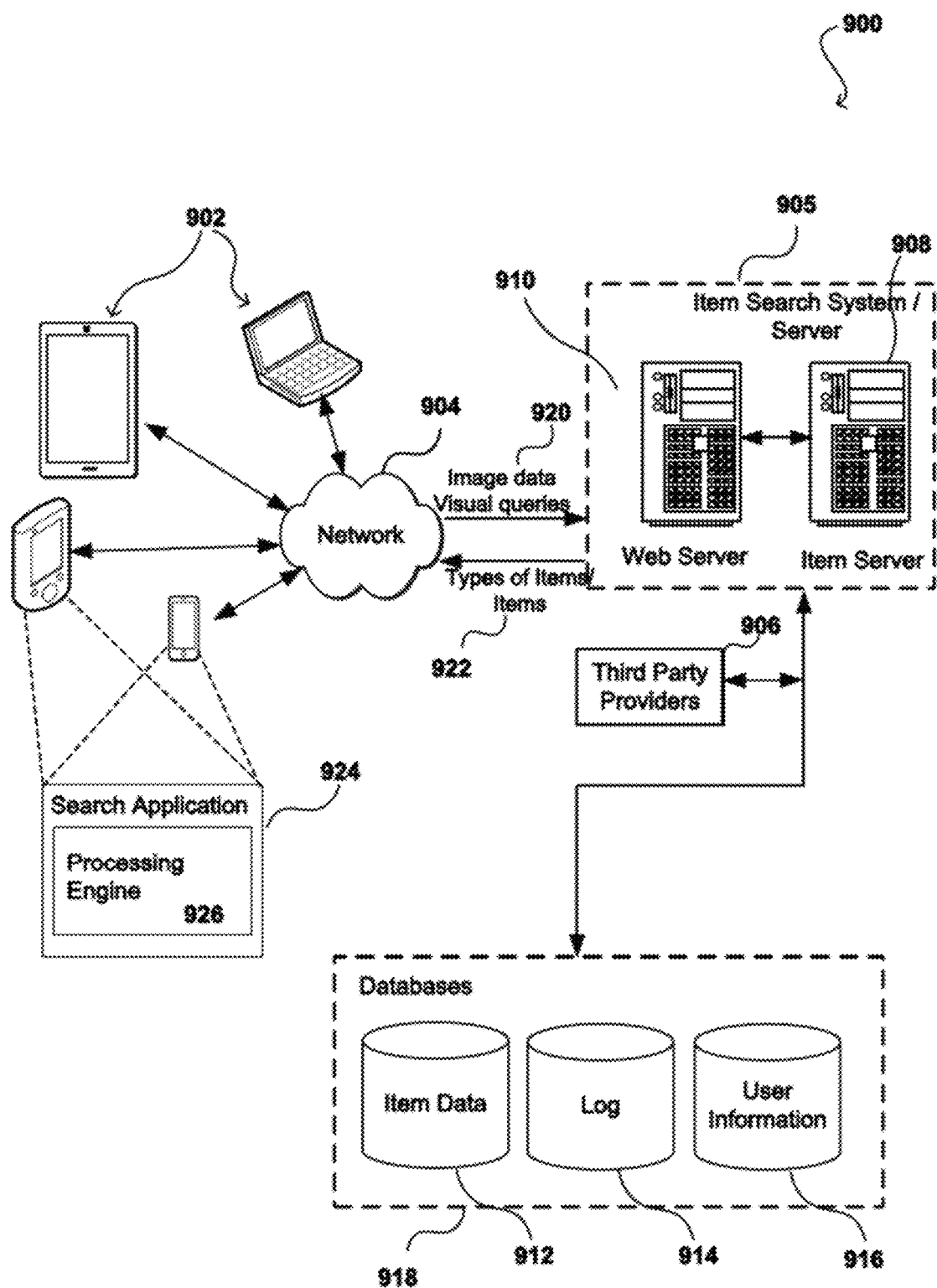
FIGS. 9A and 9B illustrate example systems for implementing aspects of the various embodiments of the present disclosure.

FIG. 9A illustrates an example system 900 for implementing aspects of the various embodiments of the present disclosure. As will be appreciated, although a web-based environment is used for purposes of explanation, different environments may be used, as appropriate, to implement various embodiments. The system 900 includes computing devices 902, which can include any appropriate device operable capture images and/or to communicate images and product information over an appropriate network 904. Examples of such computing devices 902 can include personal computers, tablets, ultrabooks, smartphones, cell phones, wearable watches and related devices, handheld messaging devices, laptop computers, set-top boxes, personal data assistants, electronic book readers and the like. Further, the computing devices 902 may include a search application 924 for capturing images, for providing through the interface the types of items and the items themselves corresponding to the image data, and for communicating with the user and the product search system/server 905. The search application may include a processing engine 926 for performing one or more image processing functions, such as to train an NN (or NNs directed to a singular goal) to generate classification predictions. Further, third party providers 906 may provide item and categorizing information directly to the item search system/server 905. The third party providers may be distributors, manufacturers, resellers, or other entities associated with the item.

The network 904 can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Communication over the network 904 can be enabled via wired or wireless connections and combinations thereof. In this example, the network includes the Internet, as the environment includes a web server 910 for receiving requests and serving content in response thereto, although for other networks, an alternative device serving a similar purpose could be used, as would be apparent to one of ordinary skill in the art.

The illustrative system 900 includes at least one application (or item/product) server 908 and a data store or databases 918. It should be understood that there can be several application servers, layers or other elements, processes or components, which may be chained or otherwise configured, which can interact to perform tasks such as obtaining data from an appropriate data store. Further, the web server 910 and the application (or item/product) server 908 are part of an item search system/sever 905. As used herein, data store or database refers to any device or combination of devices capable of storing, accessing and retrieving data, which may include any combination and number of data servers, databases, data storage devices and data storage media, in any standard, distributed or clustered environment. The application server 908 can include any appropriate hardware and software for integrating with the data store 918 as needed to execute aspects of one or more applications for the client device and handling the image data and/or visual queries 920 for an application of the computing device 902. In response, types of items, item listings, items, item updates, content posts related to one or more items, or products 922 are provided from the item or product search system/server 905. The application server 908 provides access control services in cooperation with the data store and is able to generate content such as text, graphics, audio and/or video to be transferred to the user, which may be served to the user by the Web server 910 in the form of hypertext markup language (HTML), extensible markup language (XML), or another appropriate structured language in this example. The handling of all requests and responses, as well as the delivery of content between the client device 902 and the application server 908, can be handled by the web server 910. It should be understood that the web and application servers are not required and are merely example components, as structured code discussed herein can be executed on any appropriate device or host machine as discussed elsewhere herein. According to an example, one or more methods described herein may be performed offline, but could also be performed at runtime such as may be required in a case where a user generates a bounding box online (or otherwise identifies an object of interest online) though a display screen and the system needs to process the information in near or real-time.

The data store 918 can include several separate data tables, databases or other data storage mechanisms and media for storing data relating to a particular aspect. For example, the data store 918, as illustrated, includes mechanisms for storing content (e.g., item/product data) 912 and user information 916, which can be used to serve content for the production side. The data store is also shown to include a mechanism for storing log or session data 914. It should be understood that there can be many other aspects that may need to be stored in the data store, such as page image information and access rights information, which can be stored in any of the above listed mechanisms as appropriate or in additional mechanisms in the data store 918. The data store 918 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a web page that the user is able to view via a browser or application on the computing device 902. In such an implementation the results listing may include hyperlinked, clickable, or selectable aspects to allow the product information to open in a same application as the image or a separate application, such as a browser, of the computing device 902.

Each server 908, 910 typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

In some embodiments, the web server 910, product server 908, and similar components, can be considered to be part of an item or product search system 905 and, broadly, of a control plane 905. The handling of all requests and responses, as well as the delivery of content between the computing devices 902 and the product server 908, can be handled by the web server 910. The web server 910 and item/product server 908 are merely example components. However, more or fewer components can be used as structured code can be executed on any appropriate device or host machine as discussed elsewhere herein.

The data plane 918 includes one or more resources, servers, hosts, instances, routers, switches, databases, other similar components, or a combination thereof. The resources of the data plane 918 are not limited to storing and providing access to data. Indeed, there may be several product servers, layers, or other elements, processes, or components, which may be chained or otherwise configured, and which can interact to perform tasks including, for example, obtaining data from an appropriate database. As used in this specification, database also refers to any device or combination of devices capable of storing, accessing, and retrieving data, which may include any combination and number of data servers, databases, data storage devices, and data storage media, in any standard, distributed, or clustered environment.

The databases of the data plane 918 can include several separate data tables, databases, or other data storage mechanisms and media for storing data relating to a particular aspect. For example, the data plane 918 illustrated includes mechanisms for storing item/product data 912 and user information 916, which can be used to serve content. The data plane 918 is also shown to include a mechanism for storing log data 914, which can be used for purposes such as reporting and analysis. The data plane 918 is operable, through logic associated therewith, to receive instructions from the product server 908 and to obtain, update, or otherwise process data, instructions, or other such information in response thereto, as described above.

Each server typically includes an operating system that provides executable program instructions for the general administration and operation of that server, and typically will include a computer-readable medium storing instructions that, when executed by a processor of the server, enable the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9A. Thus, the depiction of the system 900 in FIG. 9A should be taken as being illustrative in nature and not limiting to the scope of the disclosure.

Figure 9B:
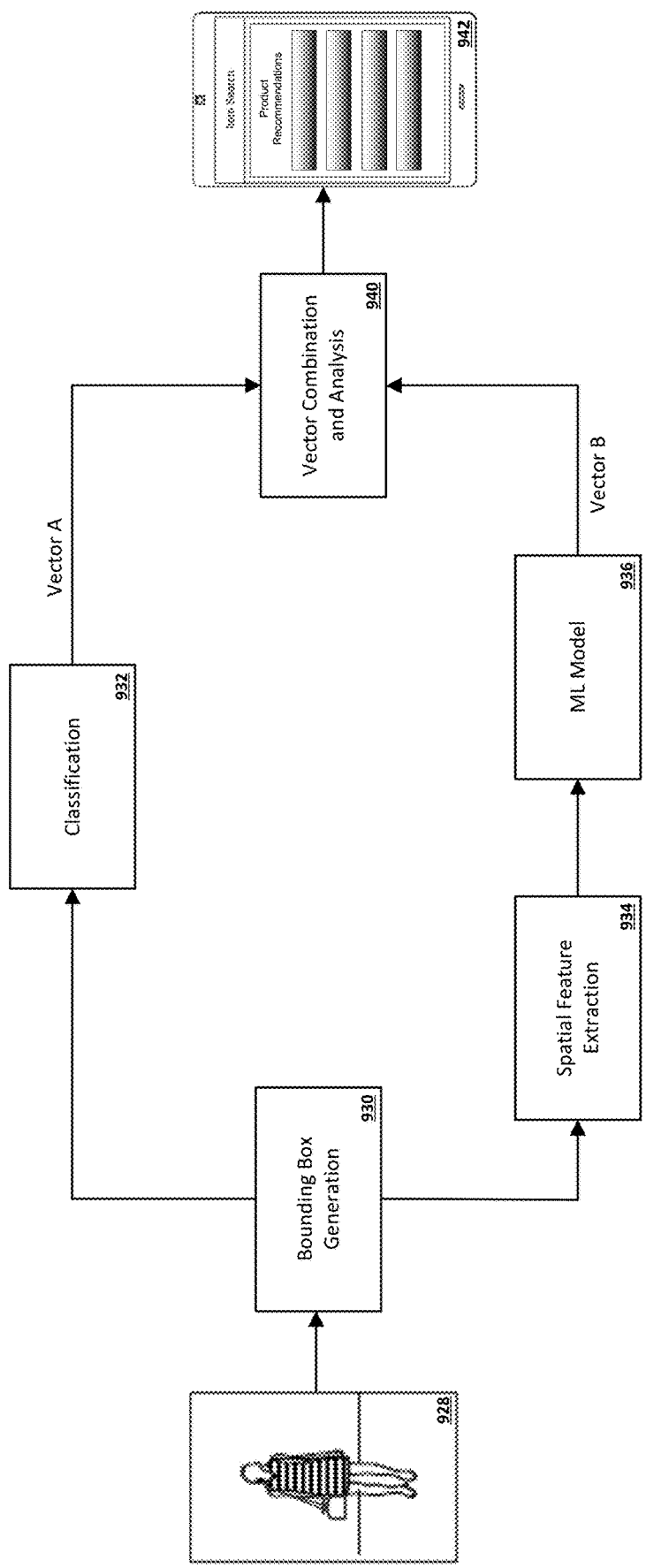

FIG. 9B illustrates an example system for implementing aspects of the various embodiments of the present disclosure. According to this example, an input image 928 may be received as part of a request for content. A bounding box may be generated around one or more objects of interest in an image 930. Using a classifier, the one or more objects of interest may be classified into one or more categories 932, and the classifications may be represented in the form of a vector, such as Vector A in this example. According to an example embodiment, this vector may be analyzed to determine whether the categorization satisfies at least a minimum threshold level of confidence. For example, the categorized object of interest may be assigned a confidence score or weight, indicating how confident the system is that the categorization of the object of interest is accurate. The confidence score or weight may then be compared against a determined threshold value. If the confidence score or weight falls below the threshold value, then one or more spatial features may be extracted from the image and analyzed 934. In another example, the one or more spatial features may be extracted from the image regardless of whether the confidence score or weight falls below the threshold value. According to an example, a bounding box may be generated around a person located in the image and compared to the bounding box around the one or more objects. Alternatively, a bounding box may be generated around a piece of furniture or other object similar object for use in extracting spatial features. "Spatial features" may include, but are not limited to, data associated with entropy of a prediction vector, an area of an object of interest normalized by image data, a size of the bounding box around the object of interest, a distance between the object of interest's centroid and the person's centroid, a distance between the object of interest's centroid and the image's centroid, a distance between the object of interest's centroid and another object's centroid, a detection score, a width of the object of interest, a height of an object of interest, an aspect ratio of the object of interest, and a delta between the object of interest and the person/other object with respect to x- and y-coordinates.

A machine learning model may analyze the spatial features 936 and generate a second prediction vector with item categories, such as Vector B in this example. The first prediction vector and the second prediction vector may then be combined 940, using a convex function or other function, to generate a third prediction vector. The third prediction vector may provide a result having a higher level of accuracy than the first prediction vector, as the third prediction vector accounts for the initial prediction and the prediction generated based on the spatial features. In some examples, the third prediction vector may be generated as an output of a second machine learning model which accepts the first vector and second vector as an input. The third prediction vector may be used to determine one or more items similar to the object of interest, and the similar items may be provided to a user on a display 942. According to another embodiment, the third vector may be used to generate or optimize a content post related to the object of interest.

Figure 10:
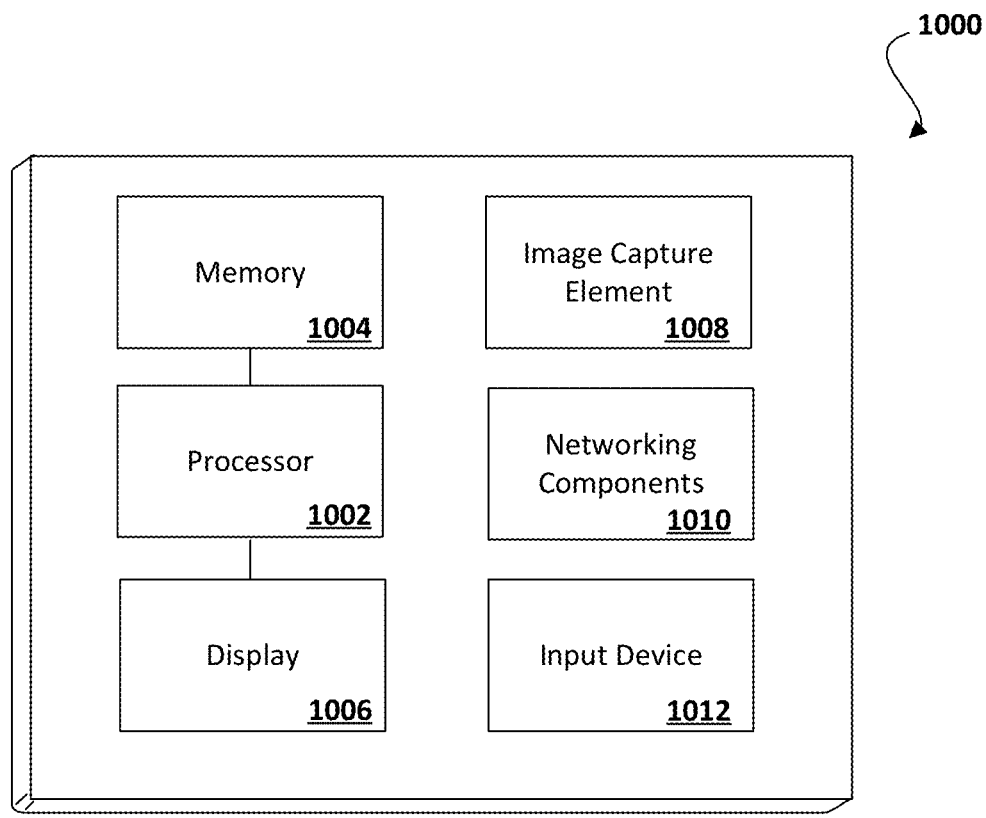
FIG. 10 illustrates a set of example components of one or more devices of the present disclosure, in accordance with various embodiments of the present disclosure.

FIG. 10 illustrates a set of example components of one or more devices 1000 of the present disclosure. In this example, the device includes at least one processor 1002 for executing instructions that can be stored in a memory device or element 1004. As would be apparent to one of ordinary skill in the art, the device can include many types of memory, data storage or computer-readable media, such as a first data storage for program instructions for execution by the processor 1002, the same or separate storage can be used for images or data, a removable memory can be available for sharing information with other devices, and any number of communication approaches can be available for sharing with other devices. The device typically will include some type of display element 1006, such as a touch screen, electronic ink (e-ink), organic light emitting diode (OLED) or liquid crystal display (LCD), although devices such as portable media players might convey information via other elements, such as through audio speakers. As discussed, the device in many embodiments will include at least one image capture element 1008, such as at least one ambient light camera that is able to image a user, people, or objects in the vicinity of the device. An image capture element can include any appropriate technology, such as a CCD image capture element having a sufficient resolution, focal range and viewable area, to capture an image of the user when the user is operating the device. Methods for capturing images or video using an image capture element with a computing device are well known in the art and will not be discussed herein in detail. It should be understood that image capture can be performed using a single image, multiple images, periodic imaging, continuous image capturing, image streaming, etc.

The device can include one or more networking components 1010 enabling the device to communicate with remote systems or services such as content providers and rights determining systems. These components can include, for example, wired or wireless communication components operable to communicate over a network such as a cellular network, local area network, or the Internet. The device can also include at least one additional input device 1012 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device. As discussed, different approaches can be implemented in various environments in accordance with the described embodiments.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof. In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc. Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information.

The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed. Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   receiving a request for content to be provided for display on a client device, the request associated with an image;
   generating a first bounding box around at least one object of interest detected in the image;
   generating a first prediction vector accounting for a first classification of the at least one object of interest, the first prediction vector associated with a first level of accuracy, wherein the first prediction vector is comprised of a set of numbers corresponding to confidence scores for use in determining whether the at least one object of interest has been accurately classified;
   generating a second bounding box around a person or another object in the image, the person or the another object being associated with the object of interest;
   determining one or more spatial features for the object of interest based, at least in part, upon a comparison of information related to the second bounding box to information related to the first bounding box;
   generating, using a machine learning model, a second prediction vector accounting for the one or more spatial features and for a second classification of the at least one object of interest, the second prediction vector associated with a second level of accuracy;
   generating, based on a convex combination of the first prediction vector and the second prediction vector, a third prediction vector associated with a higher level of accuracy than at least the first level of accuracy; and
   presenting the content for display on the client device, the content determined based, at least in part, upon the third prediction vector.

2. The computer-implemented method of claim 1, further comprising:
   classifying the at least one object of interest into one or more item types;
   determining that the classification of the at least one object of interest fails to satisfy at least a minimum threshold level of confidence; and
   in response to determining that the classification of the object of interest fails to satisfy the minimum threshold level of confidence, determining the one or more spatial features from the image data within the second bounding box.

3. The computer-implemented method of claim 1, further comprising:
   fine-tuning one or more determined categories of items prior to generation of the third prediction vector based, at least in part, upon a grid-search process configured to identify a category, of the one or more determined categories, that most accurately matches the object of interest.

4. The computer-implemented method of claim 1, wherein the one or more spatial features are determined using machine learning, and
   wherein the second prediction vector is generated based, at least in part, upon pose information determined for at least one person detected in the image.

5. A computer-implemented method, comprising:
   generating a first bounding box around at least one object of interest present in an input image;
   generating a first prediction vector for a first classification of the object of interest, wherein the first prediction vector comprises a set of confidence values associated with the first classification;
   generating a second bounding box around another object in the image, the another object being associated with the object of interest;
   determining one or more image features for the object of interest based, at least in part, upon a comparison of information related to the second bounding box to information related to the first bounding box;
   generating a second prediction vector for a second classification of the at least one object of interest, based, at least in part, upon the one or more image features; and
   generating, based, at least in part, upon a convex combination of the first prediction vector and the second prediction vector, a third prediction vector for a third classification of the at least one object of interest, the third prediction vector associated with a higher level of accuracy than at least the first prediction vector.

6. The computer-implemented method of claim 5, further comprising:
   classifying the at least one object of interest into one or more item types;
   determining that the classification of the at least one object of interest fails to satisfy at least a minimum threshold level of confidence; and
   in response to determining that the classification of the object of interest fails to satisfy the minimum threshold level of confidence, determining the one or more image features relative to the at least one object of interest.

7. The computer-implemented method of claim 6, wherein the first prediction vector corresponds to a vector comprised of a set of confidence scores for use in determining whether the at least one object of interest has been accurately classified.

8. The computer-implemented method of claim 5, further comprising:
   fine-tuning one or more determined categories of items prior to the generation of the third prediction vector based, at least in part, upon a grid-search process configured to identify a category, of the one or more determined categories, that most accurately matches the object of interest.

9. The computer-implemented method of claim 5, wherein the one or more image features correspond to spatial features including at least one of: data associated with entropy of the first prediction vector and the second prediction vector, an area of the object of interest normalized by image data, a size of the first bounding box provided around the object of interest, a distance between a centroid of the object of interest and a centroid of at least one image feature within the second bounding box, a distance between the centroid of the object of interest and a centroid of the image, a distance between the centroid of the object of interest and a centroid of another object present in the image, a detection score, a width of the object of interest, a height of an object of interest, a width of the bounding box around the object of interest, a height of the bounding box around the object of interest, an aspect ratio of the object of interest, and a delta between the object of interest and a person or other object in the image with respect to x- and y-coordinates.

10. The computer-implemented method of claim 5, wherein the one or more image features are determined using machine learning, and
wherein the second prediction vector is generated based, at least in part, upon pose information determined for at least one person detected in the image.

11. A system comprising:
at least one processor; and
memory including instructions that, when executed by the at least one processor, cause the system to:
generate a bounding box around at least one object of interest present in an input image;
generate a first prediction vector for a first classification of the object of interest, wherein the first prediction vector comprises a set of confidence values associated with the first classification;
generate a second bounding box around another object in the image, the another object being associated with the object of interest;
determine one or more image features for the object of interest based, at least in part, upon a comparison of information related to the second bounding box to information related to the first bounding box;
generate a second prediction vector for a second classification of the at least one object of interest, based, at least in part, upon the one or more image features; and
determine, based, at least in part, upon a convex combination of the first prediction vector and the second prediction vector, a third prediction vector for a third classification of the at least one object of interest, the third prediction vector associated with a higher level of accuracy than at least the first prediction vector.

12. The system of claim 11, wherein the instructions, when executed by the at least one processor, further cause the system to:
classify the at least one object of interest into one or more item types;
determine that the classification of the at least one object of interest fails to satisfy at least a minimum threshold level of confidence; and
in response to determining that the classification of the object of interest fails to satisfy the minimum threshold level of confidence, determine the one or more image features relative to the at least one object of interest.

13. The system of claim 12, wherein the first prediction vector corresponds to a vector comprised of a set of confidence scores for use in determining whether the at least one object of interest has been accurately classified.

14. The system of claim 11, wherein the instructions, when executed by the at least one processor, further cause the system to:
fine-tune one or more determined categories of items prior to the determination of the third prediction vector based, at least in part, upon a grid-search process configured to identify a category, of the one or more determined categories, that most accurately matches the object of interest.

15. The system of claim 12, wherein the one or more image features are determined using machine learning, and
wherein the second prediction vector is generated based, at least in part, upon pose information determined for at least one person detected in the image.

16. The method of claim 1, wherein the one or more spatial features include at least one of: data associated with entropy of the first prediction vector and the second prediction vector, an area of the object of interest normalized by image data, a size of the first bounding box provided around the object of interest, a distance between a centroid of the object of interest and a centroid of at least one image feature within the second bounding box, a distance between the centroid of the object of interest and a centroid of the image, a distance between the centroid of the object of interest and a centroid of another object present in the image, a detection score, a width of the object of interest, a height of an object of interest, a width of the bounding box around the object of interest, a height of the bounding box around the object of interest, an aspect ratio of the object of interest, and a delta between the object of interest and a person or other object in the image with respect to x- and y-coordinates.

* * * * *